United States Patent
Haglund

(10) Patent No.: US 6,685,270 B2
(45) Date of Patent: Feb. 3, 2004

(54) RECLINER MECHANISM

(75) Inventor: Lennart Haglund, Vårgårda (SE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 10/181,025

(22) PCT Filed: Jan. 3, 2001

(86) PCT No.: PCT/SE01/00002
§ 371 (c)(1),
(2), (4) Date: Jul. 12, 2002

(87) PCT Pub. No.: WO01/51306
PCT Pub. Date: Jul. 19, 2001

(65) Prior Publication Data
US 2003/0011230 A1 Jan. 16, 2003

(30) Foreign Application Priority Data
Jan. 14, 2000 (GB) .......................................... 0000885

(51) Int. Cl.⁷ .............................................. B60N 2/02
(52) U.S. Cl. ............. 297/367; 297/354.12; 297/378.12
(58) Field of Search ........................... 297/354.12, 367, 297/369, 378.12

(56) References Cited

U.S. PATENT DOCUMENTS 4,720,144 A 1/1988 Heesch
5,474,360 A * 12/1995 Chang

FOREIGN PATENT DOCUMENTS

| EP | 0 509 865 A2 | 10/1992 |
| EP | 0 518 130 A1 | 12/1992 |
| EP | 0 917 984 A2 | 5/1999 |
| JP | 55-164532 | * 12/1980 |
| JP | 2-85029 | * 3/1990 |
| WO | WIPO 98/25787 A1 | 6/1998 |

* cited by examiner

Primary Examiner—Laurie K. Cranmer
(74) Attorney, Agent, or Firm—Venable LLP; Robert Kinberg

(57) ABSTRACT

A recliner mechanism for a seat has a support structure (1, 2) to be connected to the squab of the seat. This structure pivotally (17) supports an arm (13) to be connected to the back of the seat so that the back of the seat may move about a pivot axis. The mounting arm has a projection (15) spaced from the pivot axis (17) engaging a link (24). The link engages a pin (30) which passes through a slot (10) formed in the support structure. The pin also passes through a diametric slot (31) formed in a drive wheel (32) which is mounted for rotation relative to the support structure. The slot (10) in the support structure is located and configured to intersect the slot (31) on the drive wheel (32) at a plurality of rotational positions thereof. The drive wheel (32) is provided with a catch means (40) adapted to retain the drive wheel (32) in predetermined selected positions.

6 Claims, 4 Drawing Sheets

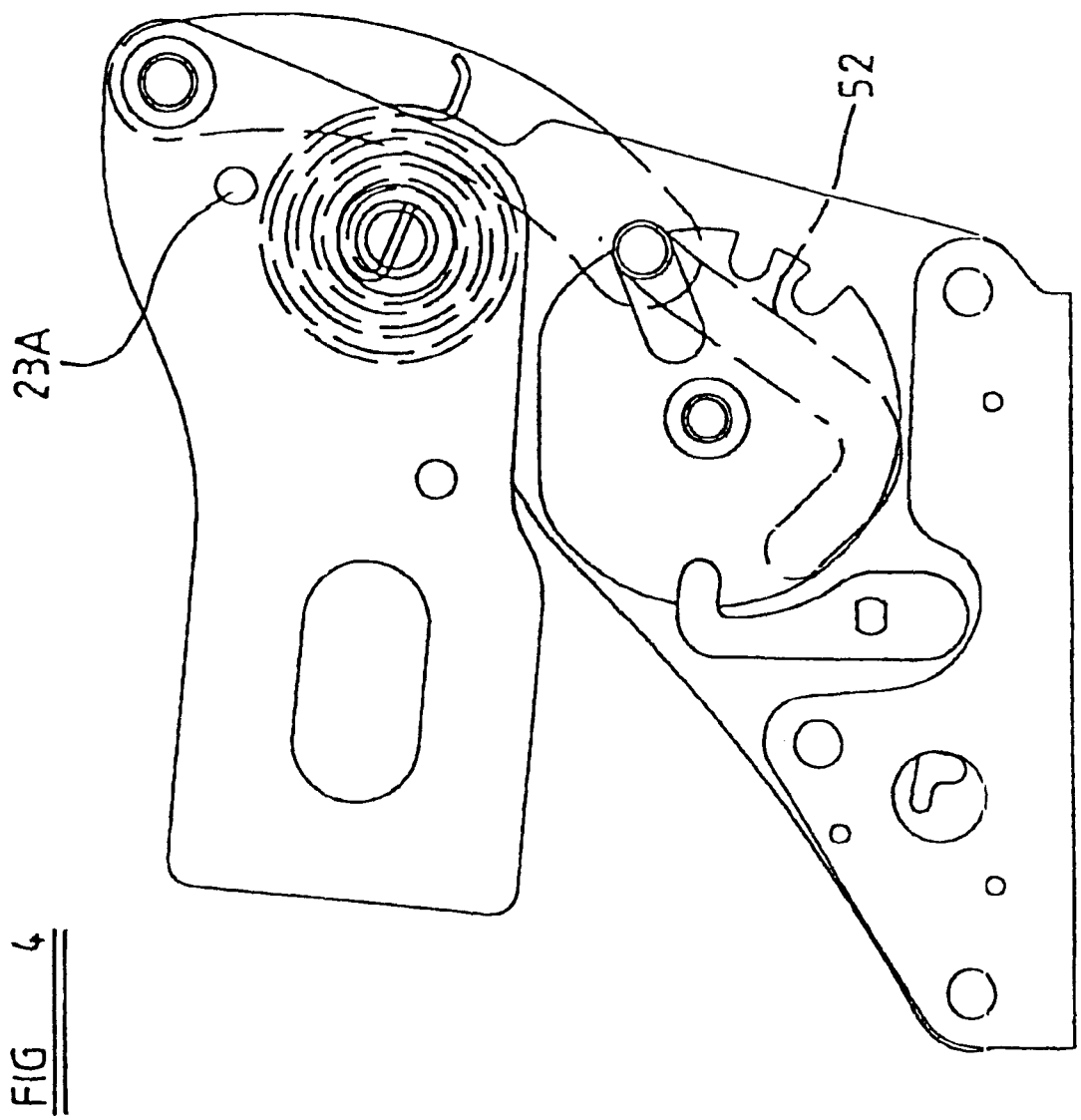

RECLINER MECHANISM

THE PRESENT INVENTION relates to a recliner mechanism for a vehicle seat adapted to enable the vehicle seat to adopt a number of predetermined relative positions. Recliner mechanisms of this type have been proposed before, but such recliner mechanisms have been relatively expensive to manufacture and/or complicated.

The present invention seeks to provide an improved recliner mechanism.

According to this invention there is provided a recliner mechanism for a vehicle seat, the recliner mechanism comprising a support structure adapted to be connected to the squab of the seat, the support structure pivotally supporting a mounting arm adapted to be connected to the back of the seat so that the back of the seat may move pivotally about a pivot axis relative to the squab of the seat, the mounting arm having means spaced from the pivot axis engaging a link, the link engaging a pin, the pin passing through a slot formed in the support structure and passing through a substantially diametrically extending slot formed in a drive wheel mounted for rotation relative to, the support structure, the slot in the support structure being located and configured to intersect the slot on the drive wheel at a plurality of rotational positions thereof, the drive wheel being provided with catch means adapted to retain the drive wheel in predetermined selected positions.

Preferably the support structure comprises two support plates of equivalent configuration which are mounted in position with the drive wheel there between, each plate defining a respective co-aligned slot, the pin passing through said co-aligned slots there being two link arms, each, link arm engaging a respective end of the pin and engaging a respective trunnion provided on the mounting arm.

Advantageously the catch means to retain the drive wheel in selected positions comprises a resiliently biased catch adapted to engage a selected recess provided in the periphery of the wheel at each said position.

Preferably the slot in the support structure is of "tick" configuration having a portion extending substantially tangentially to the periphery of the said wheel.

Conveniently when the seat is in a first or maximally reclined position, the said connecting pin is located at one end of the slot, and when the seat is in another, fully forward position, the pin is at another end of the said slot.

Advantageously resilient means are provided to bias the arm supporting the back-rest pivotally forwardly.

Figure 1:
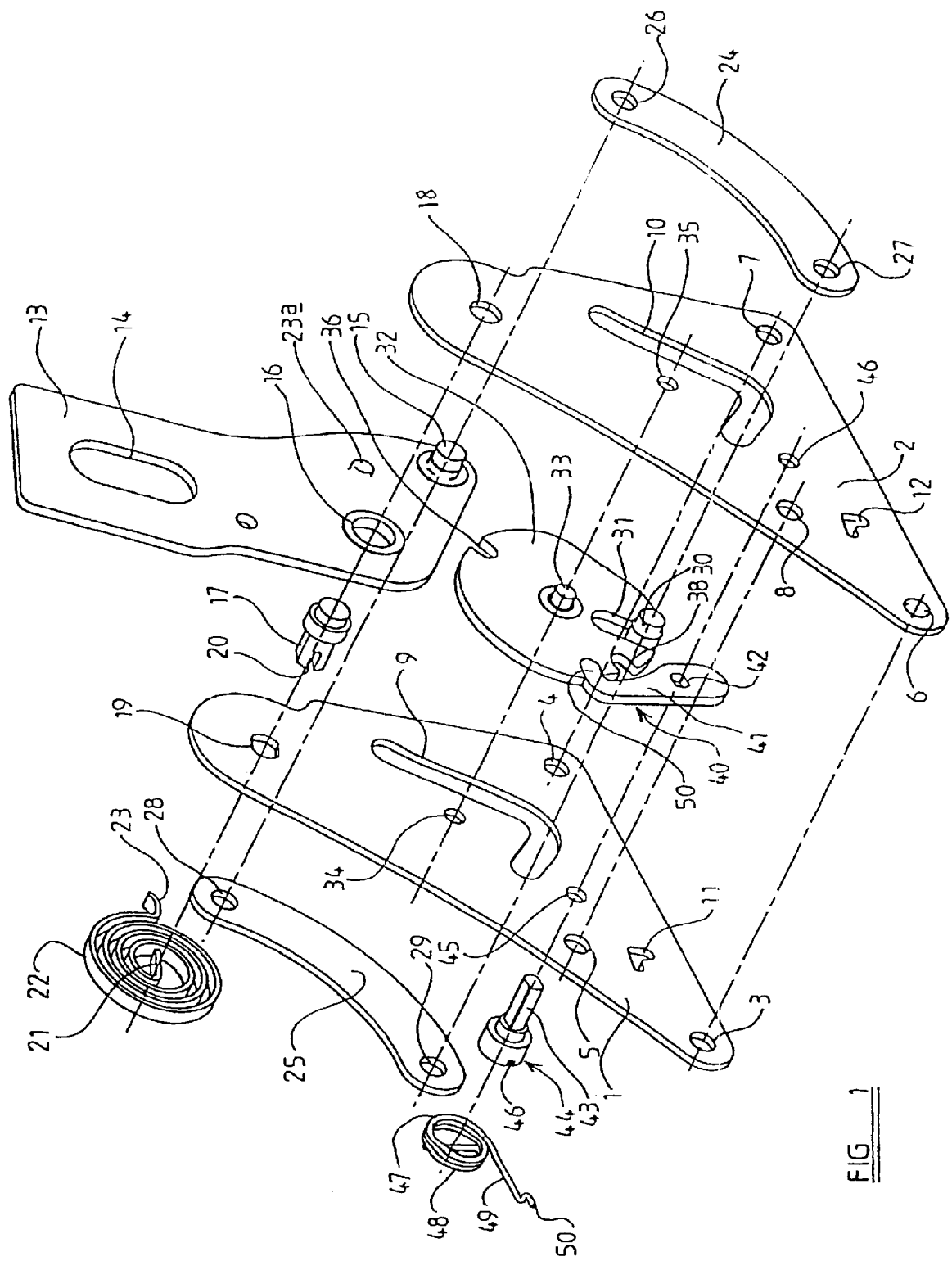
Figure 2:
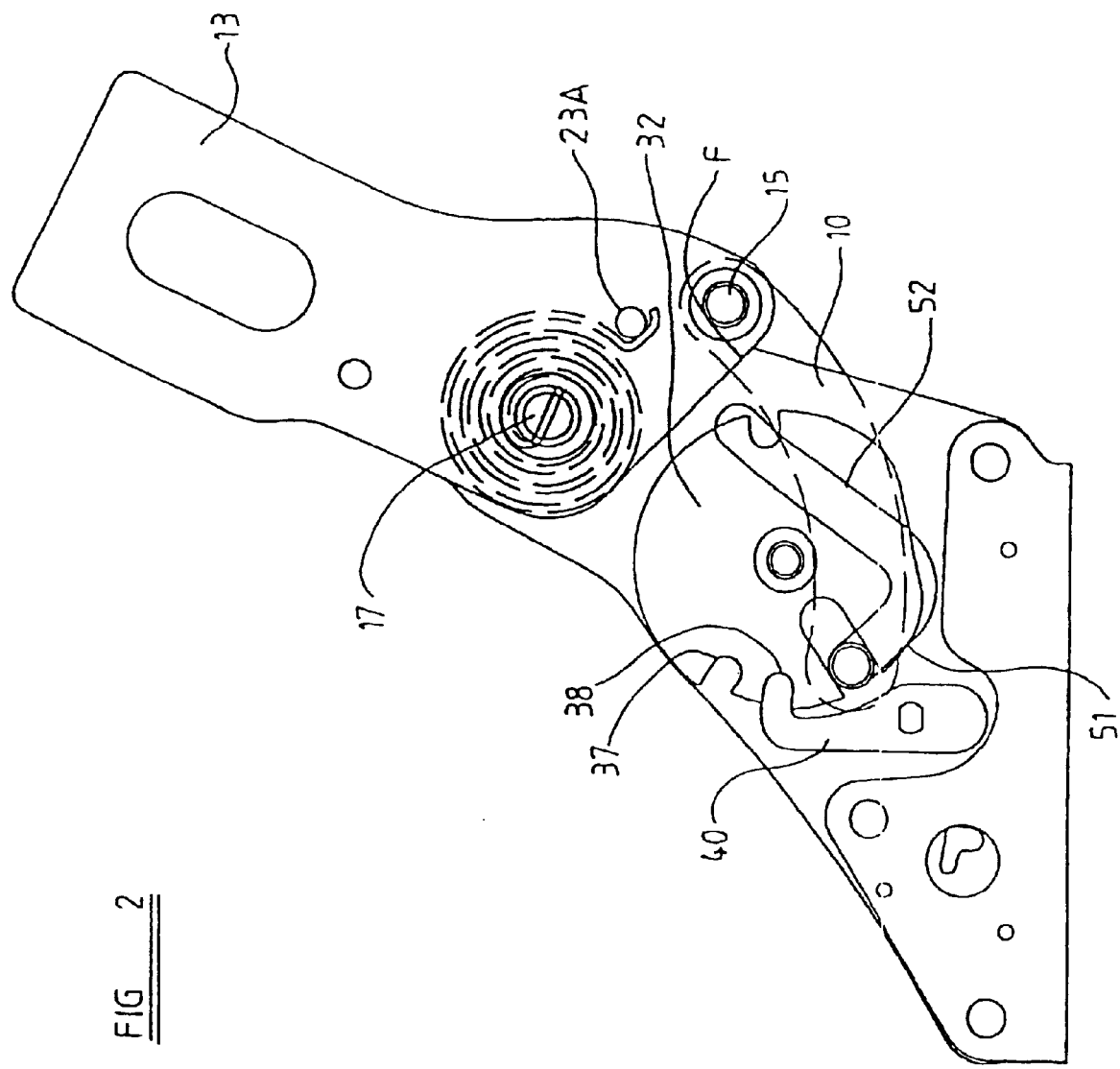
Figure 3:
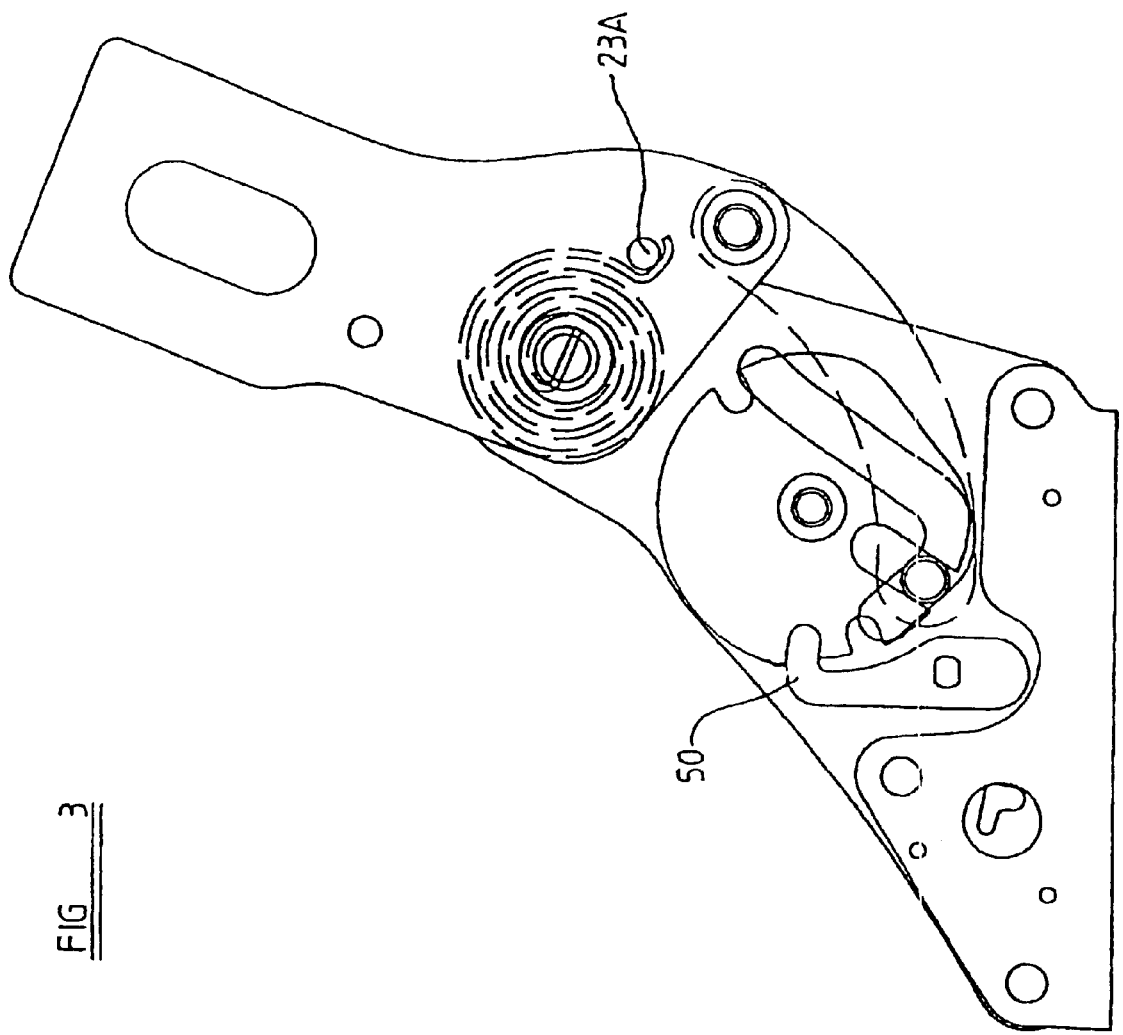

In order that the invention may be more readily understood, and so that further features thereof may be appreciated, the invention will now be described, by way of example, with reference to the accompanying drawings in which:

FIG. 1 is an exploded view of a recliner mechanism in accordance with the invention, FIG. 2 is a side view illustrating the recliner mechanism in the first position, FIG. 3 is a side view corresponding to FIG. 2 showing the recliner mechanism in an alternate condition, and FIG. 4 is a side view corresponding to FIG. 2 illustrating the recliner mechanism in a third position.

Referring initially to FIG. 1, a recliner mechanism comprises a pair of almost identical support plates 1, 2 adapted to be secured to the squab of a vehicle seat. The support plates 1, 2 are generally triangular. The plate 1 is provided with apertures 3, 4 adjacent the lower corners thereof, and a further aperture 5 located adjacent the upper inclined edge of the triangular plate, and the plate 2 is provided with corresponding apertures 6, 7 adjacent the lower corners and a corresponding aperture 8 adjacent the upper edge of the triangular plate. Bolts may pass through the co-aligned apertures 3, 6, the co-aligned apertures 4, 7 and the co-aligned apertures 5, 8 to secure the plates together, and also to mount the plates to the squab of a vehicle seat.

The plates are provided with various other apertures which, as will be described hereinafter, support various components of the recliner mechanism for rotation, and each plate is also provided with a "tick"-shaped slot, the plate 1 having slot 9, and the plate 2 having slot 10. Additionally the plates are each provided with a respective L-shaped spring retaining aperture, the plate 1 having aperture 11 and the plate 2 having aperture 12. The plates, as mentioned, are substantially identical and lie adjacent each other with corresponding parts of the plates being co-aligned.

A mounting arm 13 is provided of elongate plate-like form provided with an elongate aperture 14. The arm 13 is adapted to be mounted to part of the back-rest of a vehicle seat so that the back-rest is connected to the squab. The arm 13 is provided, adjacent its lower end, as illustrated in FIG. 1, with projecting trunnions 15. The trunnions project on each side of the arm. The lower end of the arm is also provided with an aperture 16. The aperture 16 receives a bearing pin 17, the opposed ends of the bearing pin being received in apertures 18, 19 formed towards the upper corners of the triangular plates 1, 2. The aperture 18 is circular, the aperture 19 has rounded ends and opposed parallel sides. One end of the bearing pin 17 has opposed flat parallel faces and is provided with an axial diametric a slot 20. The slot 20 receives a linear end portion 21 of the helical clock spring 22, the other, or outer end of the clock spring 22 forming an outwardly directed tab 23 which engages a projection 23A on the arm 13. It is to be noted that the end of the mounting pin 17 provided with the slot 20 with the flat faces is received within the aperture 19 that has two flat opposed sides, so that the mounting pin 17 cannot rotate. It is to be appreciated that the spring 22 serves to provide a spring-bias to the projection 23A tending to rotate the arm 13 in an anti-clockwise direction as shown in the drawings.

It is to be understood, therefore, that the back of the seat may be mounted on the arm 13, and is then mounted for a pivoting movement about the axis defined by the connecting pin 17, with the back of the seat being biased to a forwardly tilted position by the clock spring 22.

Two elongate arcuate links 24, 25 are provided. The arcuate link 24 has apertures 26, 27 at the opposed ends thereof, and similarly the link 25 has apertures 28, 29 at opposed ends thereof. The apertures 26 and 28 of the links are engaged with the protruding ends of the trunnions 15 provided at the lower end of the arm 13. The trunnions are located at a position beyond the peripheries of the two triangular plates 1, 2. The arcuate links 24, 25 extend adjacent the outer surfaces of the two plates 1, 2. The apertures 27 and 29 of the links 24, 25 engage trunnions provided at opposite ends of a drive pin 30. The drive pin 30 extends between the two plates 1, 2, and the trunnions on the drive pin 30 extends outwardly through the tick-shaped slots 9, 10.

The drive pin 30 is received within a substantially radial slot 31 that is formed within a drive wheel 32. The drive wheel 32 is mounted on a shaft 33, the ends of the shaft being received in apertures 34, 35 provided in the plates 1, 2 for that purpose. Three substantially "U"-shaped recesses 36, 37, 38 are provided at angularly spaced positions around the periphery of the wheel 32.

A catch 40 is provided. The catch 40 comprises an elongate lever arm 41 which is provided with an oval aperture 42. The oval aperture 42 receives an oval peg 43 forming part of a latch support member 44, the peg 43 extending through apertures 45, 46 provided for that purpose in the plates 1, 2. The latch support member 44 is provided with an enlarged head 45 having, in its exposed end face, a diametric groove 46. The diametric groove 46 receives a terminal arm 47 provided on a helical spring 48 that surrounds the enlarged head 45. The spring 48 terminates with an outwardly projecting arm 49 having an offset end 50. The offset end 50 is received within the L-shaped aperture 11 fonned in the plate 1. The elongate lever arm 41 carries a perpendicularly extending finger 50 dimensioned to be received in any one of the U-shaped recesses 36, 37, 38 formed in the periphery of the wheel 32 when the recess is at a predetermined position in alignment with the finger 50.

As can be seen from FIG. 2 of the accompanying drawings the lower part of the tick-shaped slot 10, identified as part 51 extends substantially tangentially to the periphery of the wheel 32.

In FIG. 2 the recliner mechanism shown in a condition that it occupies when the seat back of the vehicle seat, as supported by the arm 13, is in a rearwardly reclined position. It can be seen that the catch 40 is engaging the U-shaped recess 38. With the catch engaging the recess 38 the wheel 32 cannot rotate.

The protruding ends of the drive pin 30 are located at the very forward end of the part 51 of the tick-shaped slot 10. If a person sitting in the seat applies a rearwardly directed force to the back-rest of the seat, thus tending to pivot the back-rest about the axis defined by the mounting pin 17, a force "F" will be applied to the drive pin 30 generally in the direction of the line extending between the trunnions 15 and the drive pin 30, as shown in FIG. 2. This will tend to move the pin firmly into the end of the part 51 of the tick-shaped slot, thus resisting any rearward movement of the back of the seat. If a forward pivoting force is applied to the back of the seat, without the catch 40 being released, again a force will be applied to the drive pin 30 along the direction of the line "F". However, the drive pin can only move along the inclined part 51 of the tick-shaped slot, and thus the component of force tending to move the drive pin 30 along the terminal part 51 of the slot is relatively low, since the terminal part 51 of the slot is substantially tangential to the periphery of the wheel 32. Thus the force that tends to rotate the wheel 32 is very low, and the catch 40 therefore need not be very strong to withstand the force. If it is desired to adjust the inclination of the seat the catch 40 is disengaged from the recess 38, and the wheel 32 is then free to rotate. The back-rest may then be moved forwardly, slightly, with a pivoting motion. In this case, the force provided along the line F is sufficient to move the drive pin 30 a short distance along the part 51 of the tick-shaped slot 10. Simultaneously the wheel 32 rotates and the pin moves radially inwardly slightly, due to the fact that the part 51 of the tick-shaped slot 10 is not precisely tangential to the wheel 32. After a short movement the recess 37 becomes aligned with the finger 50 carried by the catch 40. The catch may be released and the finger 50 will engage the recess 37, with the recliner mechanism then having the condition illustrated in FIG. 3. It is to be appreciated that in this condition the back-rest of the seat is rather more up-right than in the condition illustrated in FIG. 2.

At this stage it should be explained that the periphery of the wheel 32 may be provided with a plurality of U-shaped recesses equivalent to the recesses 37 and 38 located closely adjacent each other, thus providing a plurality of degrees of inclination or "rake" of the back seat of the vehicle.

If it is desired to fold the back seat of the vehicle substantially forwardly, for example if the seat is the front seat of a two-door vehicle and the entire back of the seat needs to be folded forwardly to provide access to the rear seat, the catch 40 may be released, and the seat back may be moved forwardly. During this forward movement of the back of the seat the link arms 24, 25 serve to move the drive pin 30 along substantially the entire length of the tick-shaped slot 10. As the connecting pin 30 moves along the slot 10 so initially the connecting pin moves radially outwardly along the slot 31 provided in the wheel 32, and subsequently moves radially inwardly to an intermediate position, with the drive pin 30 finally moving radially outwardly until the condition illustrated in FIG. 4 is achieved with the drive pin 30 located at the end of the second part 52 of the slot. With the drive pin 30 in this condition, a further forward pivoting motion of the back-rest is prevented, and also the catch engages the recess 36. If there is any tendency for the back-rest to be moved upwardly, only a very low rotational force is applied to the wheel 31, meaning that the catch 40 can withstand the force.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A recliner mechanism for a vehicle seat, the recliner mechanism comprising a support structure adapted to be connected to the squab of the seat, the support structure pivotally supporting a mounting arm adapted to be connected to the back of the seat so that the back of the seat may move pivotally about a pivot axis relative to the squab of the seat, the mounting arm having means spaced from the pivot axis engaging a link, the link engaging a pin, the pin passing through a slot formed in the support structure and passing through a substantially diametrically extending slot formed in a drive wheel mounted for rotation relative to the support structure, the slot in the support structure being located and configured to intersect the slot on the drive wheel at a plurality of rotational positions thereof, the drive wheel being provided with catch means adapted to retain the drive wheel in predetermined selected positions.

2. A mechanism according to claim 1, wherein the support structure comprises two support plates of equivalent configuration which are mounted in position with the drive wheel there between, the slot in the support plate comprises first and second slots, each support plate defining a respective one of the first and second slots, the first and second slots being co-aligned, the pin passing through the first and second co-aligned slots, and each link arm engaging a respective end of the pin and engaging a respective trunnion provided on the mounting arm.

3. A mechanism according to claim 1 wherein the catch means to retain the drive wheel in selected positions comprises a resiliently biased catch adapted to engage a selected recess provided in the periphery of the wheel at each said position.

4. A recliner according to claim 1 wherein the slot in the support structure is of "tick" configuration having a portion extending substantially tangentially to the periphery of the said wheel.

5. A mechanism according to claim 1, wherein when the seat is in a first or maximally reclined position, the pin is located at one end of the slot, and when the seat is in another, fully forward position, the pin is at another end of the said slot.

6. A recliner according to claim 1, wherein resilient means are provided to bias the mounting arm supporting the back of the seat pivotally forwardly.

* * * * *